United States Patent [19]

Verde

[11] Patent Number: 4,675,112

[45] Date of Patent: Jun. 23, 1987

[54] PROCESS FOR THE CLARIFICATION OF WATER

[76] Inventor: Luigi Verde, Lungo Po Antonelli 7, Torino, Italy

[21] Appl. No.: 845,145

[22] Filed: Mar. 27, 1986

[30] Foreign Application Priority Data

Mar. 27, 1985 [IT] Italy ............................... 67303 A/85

[51] Int. Cl.$^4$ ............................. C02F 3/08; C02F 1/52
[52] U.S. Cl. ................................ 210/616; 210/711; 210/713; 210/631
[58] Field of Search ................ 210/150, 151, 616–618, 210/502.1, 631, 670, 663, 711–713

[56] References Cited

U.S. PATENT DOCUMENTS

| | | | |
|---|---|---|---|
| 3,855,120 | 12/1974 | Garbo | 210/618 |
| 4,009,099 | 2/1977 | Jeris | 210/618 |
| 4,167,479 | 9/1979 | Besik | 210/617 |
| 4,482,458 | 11/1984 | Rovel et al. | 210/150 |
| 4,534,864 | 8/1985 | Rigouard | 210/618 |

FOREIGN PATENT DOCUMENTS

| | | | |
|---|---|---|---|
| 2329279 | 1/1975 | Fed. Rep. of Germany | 210/151 |
| 60-28887 | 2/1985 | Japan | 210/616 |

*Primary Examiner*—Benoit Castel
*Attorney, Agent, or Firm*—Sughrue, Mion, Zinn, Macpeak & Seas

[57] ABSTRACT

In the process for the purification of water by flocculation, a porous granular material is used as a decantation accelerator and is preferably constituted by pyroclasts which can act as a substrate for a bacterial growth which achieves biological purification together with the chemico-physical purification of the flocculation.

1 Claim, 1 Drawing Figure

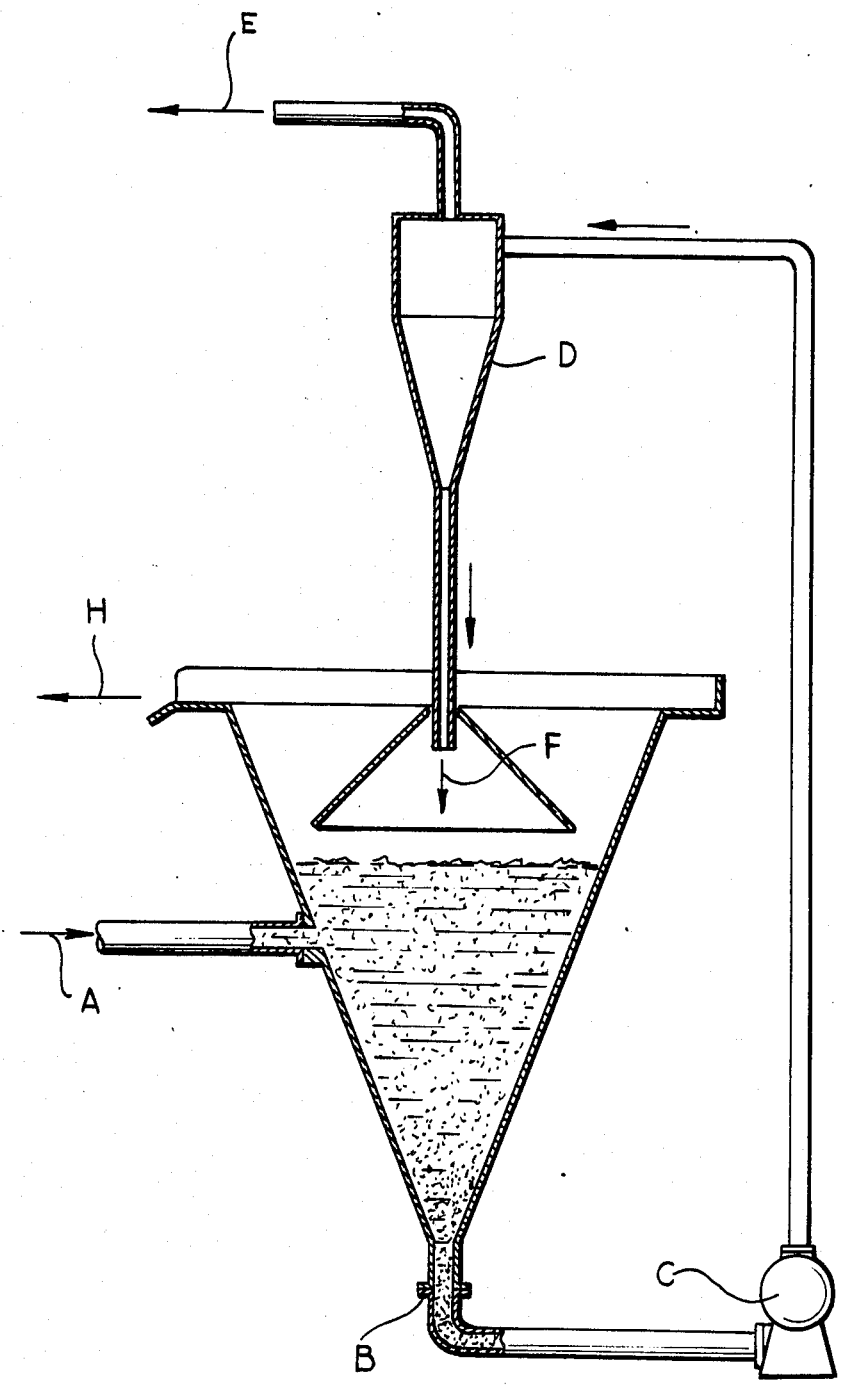

PROCESS FOR THE CLARIFICATION OF WATER

BACKGROUND OF THE INVENTION

The present invention relates to a chemico-physico-biological treatment carried out in a flocculating basin so as to make surface water drinkable.

The inventive characteristic is focussed on the use of a porous microgranular material in an environment with a basic pH, free from chlorine to allow bacteria to multiply, and on the use of a chemical coagulant in very small quantities for flocculating the non-biodegradable substances.

In the prior art biological purification is carried out in flocculating or decanting basins by either a purely chemical technique or by a biological technique but not in a system in which it is suitable to carry out the two processes simultaneously. The present invention is applicable particularly to slightly polluted waters with B.O.D. values of the order of milligrams per liter and with bacterial contents as low as 10,000 colonies or less per cubic centimeter of water.

In the treatment of water for drinking, it is usual to add powdered carbon to the flocculation basin and this agglomerates into a floc and is removed therewith; this method does not allow the active carbon to be recovered nor does it allow the pre-chlorination to be omitted nor the pH to be maintained at a basic level and thus the carbon acts only as an adsorbent. There are treatment systems in which the floc in the flocculated water is weighted by the addition of microsand. The sedimented material is freed from the floc and recycled for the same purpose of providing ballast for the sludge in the flocculation basin.

SUMMARY OF THE INVENTION

It has now been discovered that, by replacing the macro-granular silicaceous material with a pyroclastic material, for example pumice, by eliminating the pre-chlorination, and by maintaining the pH at a constant value not far from 8 with bases, one can create conditions favourable to the formation of a biomass which is active in biological purification.

The present invention thus provides a process for the purification of water in a vertical flow in which there is added to the water to be purified a flow of granular material which can act as a decantation accelerator and a flocculating agent, wherein the material acting as the decantation accelerator comprises a macro-porous granular material having particle sizes of from 20 to 200 microns and a surface area less than 200 m$^2$/g, the porous granular material being able to accept the charge of bacteria which are active in the biological purification.

By the term macroporous granular material is meant a material having an average pore size greater than 100 Å, preferably such as pumice.

In the process of the invention, the flow of water to be purified, is previously aerated when necessary to give a dissolved-oxygen content corresponding to substantially aerobic conditions. In the process of the invention, alkalis are previously added to the flow of water to be purified to keep the pH in the flocculation basin close to pH 8 and at least constant at pH 7.4 and pH 8.1.

A further advantage of the process lies in the fact that it does not need the addition of the weighting agents generally used in the prior art, such as for example alginates, bentonites, starches and synthetic polyelectrolytes such as polymers of acrylamide and methacrylamide.

BRIEF DESCRIPTION OF THE DRAWING

Further advantages and characteristics of the process of the invention will become apparent from the following example with reference to the appended drawing which illustrates the process schematically.

DESCRIPTION OF THE PREFERRED EMBODIMENT

To a clarifier of the fluidised-bed CYCLOFLOC ® type, there is supplied at A water having the following characteristics:

T.O.C. = 1.8 p.p.m.
NH$_3$ = 0.26 p.p.m.
pH = 7.9
Turbidity = 20 J.T.U.
Concentration of reagents added
Flocculent (polychloride of Al) = 1.2 p.p.m. in Al$_2$O$_3$
Alkali (NaOH) = 5 p.p.m.

A decantation accelerator is fed into the clarifier at A and is constituted by: 2.5 liters of porous pumice granules with a diameter of between 20 and 200 microns per cubic meter of water to be treated in one hour.

The sludge resulting from the sedimentation of the floc and the material associated therewith is discharged at B from the bottom of the clarifier. The sludge is fed to a hydrocyclone separator D by a pump C.

The lighter floc E is discharged from the top of the hydrocyclone D, while the granular material constituting the substrate for the bacteria is discharged from the bottom and is recycled at F to the clarifier.

The period for which the water stays in the clarifier is one hour.

The clarified water extracted at H from the clarifier has the following characteristics:

T.O.C. = 1.2 p.p.m.
Turbidity = 1.5 J.T.U.
NH$_3$ = less than 0.1 p.p.m.

The T.O.C. value is reduced by 33% and the ammonia content is reduced to a negligible value, showing the concomitance of biological purification in the clarifier.

It is understood that, the principal of the invention remaining the same, the details of the process could be varied widely without thereby departing from the scope of the present invention.

What is claimed is:

1. A process for the purification of water having a BOD value of the order of milligrams per liter and with bacterial contents as low as 10,000 colonies or less per cubic centimeter of water to obtain drinkable water by flocculation in a vertical flow flocculating basin, comprising adding to the flow of water to be purified a flow of granular material which acts as a decantation accelerator, a substrate for bacteria and a flocculating agent, wherein said granular material consists of a macroporous granular pumice stone having a particle size of between 20μ and 200μ and surface area of less than 200 m$^2$/g and an average pore size higher than 100 Å so a to be able to accept a charge of bacteria active in biological purification, adding a basic substance to the flow of water to be purified so as to maintain said flow of water at a pH between 7.4 and 8.1 thereby creating conditions favourable to the formation of biomass active in biological purification and aerating the flow of water to be purified to give a dissolved oxygen content corresponding substantially to aerobic conditions removing clarified drinkable water from said basin thereby leaving a sludge containing said granular material, separating said granular material from the sludge and recycling said granular material into the flow of water to be purified.

* * * * *